United States Patent
Magnusson et al.

(10) Patent No.: US 6,208,387 B1
(45) Date of Patent: Mar. 27, 2001

(54) ADVERTISEMENT AT TV-TRANSMISSION

(75) Inventors: Peter Magnusson, Karlstad; Leif Bengtsson, Hagersten, both of (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/147,396

(22) PCT Filed: May 27, 1997

(86) PCT No.: PCT/SE97/00870

§ 371 Date: Mar. 31, 1999

§ 102(e) Date: Mar. 31, 1999

(87) PCT Pub. No.: WO97/49236

PCT Pub. Date: Dec. 24, 1997

(30) Foreign Application Priority Data

Jun. 20, 1996 (SE) .................................................. 9602503

(51) Int. Cl.[7] .............................. H04N 9/74; H04N 5/76
(52) U.S. Cl. ...................... 348/578; 348/584; 348/589; 348/580; 348/581; 348/590; 345/327
(58) Field of Search .................................. 348/578, 580, 348/581, 582, 583, 584, 585, 588, 589, 590, 591, 592, 593, 600, 9, 135, 139, 157, 569; 345/327; H04N 9/74, 5/76

(56) References Cited

U.S. PATENT DOCUMENTS

| | | |
|---|---|---|
| 5,231,494 | 7/1993 | Wachob . |
| 5,319,455 | 6/1994 | Hoarty et al. . |
| 5,491,517 * | 2/1996 | Kreitman ............................. 348/591 |
| 5,731,846 * | 3/1998 | Kreitman .............................. 348/586 |
| 5,808,695 * | 9/1998 | Rosser ................................... 348/584 |
| 5,892,554 * | 4/1999 | DiCicco ................................ 348/589 |
| 5,953,076 * | 9/1999 | Astle ..................................... 348/584 |
| 5,953,077 * | 9/1999 | Honey ................................... 348/589 |

FOREIGN PATENT DOCUMENTS 0 424 648    9/1990   (EP) .

* cited by examiner

*Primary Examiner*—Matthew Luu
*Assistant Examiner*—Wesner Sajous
(74) *Attorney, Agent, or Firm*—Oblon, Spivak, McClelland, Maier & Neustadt, P.C.

(57) ABSTRACT

A device and method for generation of digital advertisement displays in real time in digital TV-transmissions. In such digital TV-transmissions, a digital coding of the image material is made before the transmission is made; this coding compresses the content of the image as much as possible to minimize necessary bandwidth utilization at transmission of the signals. In connection with this coding and by means of pattern recognition, different patterns are identified for predefined objects in the image material, such as for example identifying an object with an unique coloring. Via the pattern identification, the image coder obtains information via a table of what the original object looks like. Also included in the table is information about which advertisement display is to be placed inside the identified object. Thus, starting from the identified object in the image material and the original form of the identified object, the advertisement display is introduced into an image storage in a TV-receiver, and the image material is transformed. TV-viewers in this way see a virtual advertisement message in the TV-transmission.

23 Claims, 1 Drawing Sheet

ADVERTISEMENT AT TV-TRANSMISSION

BACKGROUND OF THE INVENTION

1. Field of the Invention

The present invention relates to a device and a method for generation of digitial advertisement displays in real time at digital TV-transmissions.

2. Discussion of the Background

Advertisement displays which are utilized in connection with for instance sport events, which are televised, normally consists of an advertising message which is applied to a supporting material of paper, plastics, metal etc. The displays therefore normally are not exchangeable during the event itself, but may be exchanged depending on which companies that want to have advertisement space at respective event. The total advertisement space therefore, at each specific event, can be said to be restricted to the for that purpose intended advertising places. The technical problem the invention relates to is to bring about a device and a method which at digital TV-transmissions makes possible one in principle infinite number of advertising messages at in advance decided places by at transmission utilize digital image processing.

To find out whether the prior art describes and possibly solves this problem a preliminary investigation was made at which the following documents were found.

D1: U.S. Pat. No. 5,231,494

D2: U.S. Pat. No. 5,319,455

D3: EP,A2 424 648

D1 describes a device which compresses a set of TV-signals, such as a main program signal and a great number of demographically selected advertising messages. The great number of compressed TV-signals are combined to a combined signal for transmission on one single TV-channel. A TV-receiver which receives the combined signal identifies characteristics of a televised viewer, and selects a specific TV-signal from the compressed TV-signals from the received combined signal depending on the characteristics of the viewer.

D2 describes an interactive multimedia system with distributed processing of video image information in nodes arranged in a cable TV system. The nodes can be used to distribute customer adapted advertisement to TV-viewers.

D3 describes a method and a device to transmit demographically selected TV-advertisement. A first TV-channel includes TV-programs and periodical advertisement messages. A second TV-channel includes different advertisement messages. Demographical characteristics of a televised viewer are identified, and selected advertisement messages are transmitted to said viewer depending on the demographical characteristics of the viewers.

The above mentioned found documents consequently describe the principle to generate virtual advertisement messages at TV-transmissions.

These documents, however, do not solve the above described problems because they do not explicitly describe advertisement messages at sport events which are arranged at in advance decided places and with in advance decided sizes.

SUMMARY OF THE INVENTION

The present invention in addition utilizes a digital image processing technology at transmission of advertisement messages which is not at all described in the above mentioned documents.

The aim with the present invention consequently is to solve the above described problem.

This aim is achieved by means of a device and a method which is characterized in that before said TV-transmission the image material is coded in an image coder, which image coder by recognition of pattern identifies and codes different predefined objects in the image material, at which the image coder, on the basis of said identification of said predefined object, via a table obtains information about the relation of the sizes of said predefined object, for instance REC 200× 150, and which advertisement display, for instance Telia, that shall be placed in the place for the image which corresponds to the place of image of the predefined object on the screen of just any TV-receiver.

A big commercial advantage of the present invention consequently is that advertisement displays in for instance a soccer arena in principle can be changed just any time during a live TV-transmission of a soccer match. An operator in this way can sell one and the same advertisement space to a number of different companies.

Further characteristics of the present invention are given in the independent patent claims.

BRIEF DESCRIPTION OF THE DRAWING

In the following a detailed description of an embodiment of the invention is given with reference to the only drawing.

DETAILED DESCRIPTION OF THE PREFERRED EMBODIMENTS

Figure 1:
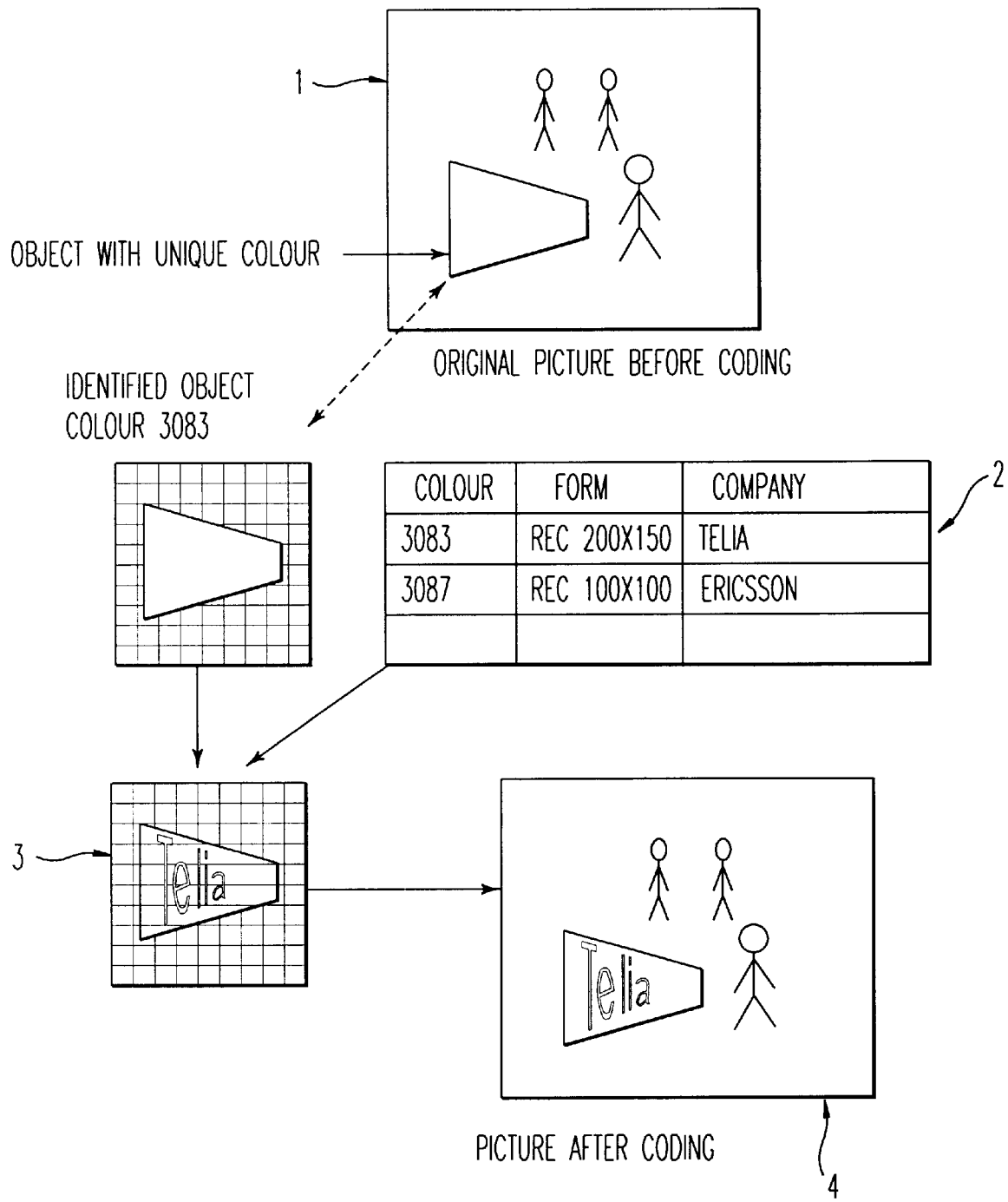
FIG. 1 shows in principle the coding of a predefined object and transformation of said object to a virtual advertisement display in a TV-viewer's receiver.

In the following a description of the invention is given with reference to FIG. 1.

The invention is applicable to a digital TV-transmission (DVB). At digital TV-transmission an extensive digital image processing (coding) is made before the transmission of the image material, principally aimed at compressing the content as much as possible in order to reduce the bandwidth of the transmission. The invention is based on that one in connection with this coding by recognition of pattern identifies different predefined objects in the image, for instance a display with a unique colour 1. It is in this case actually the colour which is identified at the coding. Via a table 2, the coder can, starting out from identified colour, get information about what the original object looks like. It can for instance be a rectangle with the measures 200×150 cm. In the table there is also defined the advertisement display which shall be applied, for instance Telia. On the basis of the identified object in the image storage and the original, the advertisement display can be transformed and introduced into the image storage 3. The TV-viewers in this way will see different virtual advertisement displays in the TV-transmission 4 depending on the colouring of the predefined object.

If, for instance, the colouring has the code "3083" an advertisement display with the text Telia is shown, and if the colouring has the code "3087" an advertisement display with the text "Ericsson" is shown. The operator can for instance see to it that the colouring of the predefined object changes between the codes "3087" and "3083" so that for instance the advertisement display "Ericsson" is shown during five minutes, whereas the advertisement display "Telia" is shown during ten minutes. This of course depends on how much advertising time Telia respective Ericsson is buying from the operator.

The table in the coder can of course be updated by an operator just as he/she wants, depending on which adveertisement displays that shall appear during the TV-transmission.

The above described is only to be regarded as an advantageous form of the present invention, and the extent of protection of the invention is only defined by what is indicated in the following patent claims.

What is claimed is:

1. Device for generation of digital advertisement displays in real time at digital TV-transmissions, comprising:
   an image coder which is arranged, before said transmission of an image material, to identify and code different predefined objects in said image material by recognition of a pattern,
   wherein said image coder, on the basis of said identification of said predefined object, via a table obtains original dimensions of said predefined object and an advertisement display is placed on an image place which corresponds to a position of said predefined object on the screen of a TV-receiver and said image coder upon identification of said predetermined object identifies a coloring of said object and different colorings are coded with different reference numbers at which said image coder looks for said reference number in said table.

2. Device according to claim 1, wherein said table is arranged in an image storage of said coder.

3. Device according to claims 1 or 2, wherein on the basis of the color of the identified object with a specific reference number and original form of said object an advertisement display is transformed and introduced into the image storage.

4. Device according to claim 1, wherein said table can be updated depending on which advertisement displays appear during any of said digital TV-transmissions.

5. Method for generation of digital advertisement displays in real time at digital TV-transmissions, comprising the steps of:
   coding by an image coder an image material before said digital TV-transmission of said image material, including the steps of,
   identifying by pattern recognition predefined objects in said image material,
   obtaining, based on said identified predefined object and via a table, information about dimensions of said predefined object and which advertisement display is to be placed into an image place which corresponds to a position of said predefined object on a screen of a TV-receiver; and
   transmitting said information by means of transmission equipment to an image storage of the TV-receiver, after which a wanted specific advertisement display corresponding to the identified predefined object is shown on a screen of said TV-receiver,
   wherein, at the step of identifying, a coloring of the predefined object is identified, at which said image coder on a basis of the coloring obtains said information about the dimensions and information about which advertisement display to apply and at the step of transmitting, on a basis of said coloring, dimensions, and applied advertisement display, said advertisement display is transformed and introduced into said image storage.

6. Method according to claim 5, wherein said table is provided in a storage.

7. Method according to claim 5, wherein TV-viewers will see different virtual advertisement displays during the TV-transmission depending on the colouring of said predefined object.

8. Method according to claim 5, wherein said table is upgraded by an operator depending on which advertisement displays that shall be shown during the TV-transmission.

9. Device according to claim 2, wherein said image coder at identification of said predefined object identifies the coloring of said object.

10. Device according to claim 2, wherein said table can be updated just as is wanted by an operator depending on which advertisement displays that shall appear during a TV-transmission.

11. Device according to claims 1 or 2, wherein said table can be updated just as is wanted by an operator depending on which advertisement displays that shall appear during a TV-transmission.

12. Device according to claims 1 or 2, wherein said table can be updated just as is wanted by an operator depending on which advertisement displays that shall appear during a TV-transmission.

13. Device according to claim 3, wherein said table can be updated just as is wanted by an operator depending on which advertisement displays that shall appear during a TV-transmission.

14. Method according to claim 6, wherein at identification and coding of said predefined object, the coloring of the object is identified, at which said image coder on the basis of identified coloring obtains information of what the original object looks like, and which advertisement display that shall be applied.

15. Method according to claim 6, wherein on the basis of said identified object in the storage, for instance "3083", and original form said advertisement display is transformed and introduced into said image storage.

16. Method according to claims 5 or 6, wherein on the basis of said identified object in the storage, for instance "3083", and original form, for instance said advertisement display is transformed and introduced into said image storage.

17. Device for generation of digital advertisement displays in real time at digital TV-transmissions, comprising:
   an image coder configured, before said transmission of a digital image material, to identify and code different predefined objects in said digital image material by pattern recognition and, on identification of said predefined object, to obtain via a table information about original dimensions of said predefined object and about which advertisement display is placed into an image place which corresponds to a position of said predefined object on a screen of a TV-receiver; and
   transmission equipment configured to transmit digitally said information to an image storage of a TV-receiver such that a specific advertisement corresponding to an identified predetermined object is shown on a screen of said TV-receiver.

18. Device according to claim 17, wherein said image coder comprises a storage including said table.

19. Device according to claim 18, wherein the storage comprises a RAM.

20. Device according to claims 17 or 18, wherein said image coder at identification of said predefined object is configured to identify the coloring of said predefined object.

21. Method for generation of digital advertisement displays in real time at digital TV-transmissions, comprising the steps of:

coding an image material before said digital TV-transmission of a said image material;

identifying by pattern recognition different predefined objects in said image material;

obtaining, on the basis of said identified predefined objects and a table, information about dimensions of said predefined objects and about which advertisement display is placed into an image place which corresponds to a position of one of said predefined objects on a screen of a TV-receiver;

transmitting digitally by means of transmission equipment said information to an image storage of the TV-receiver; and displaying the advertisement display inside said one of said predefined objects on a screen of said TV-receiver.

22. Method according to claim 21, wherein the step of obtaining comprises the step of:

providing said table in a storage.

23. Method according to claim 22, wherein the step of providing said table comprises the step of:

providing a RAM-storage in said image coder.

* * * * *